(12) United States Patent
Munechika

(10) Patent No.: US 9,383,857 B2
(45) Date of Patent: Jul. 5, 2016

(54) DRIVER IC AND DISPLAY DEVICE

(71) Applicant: Synaptics Display Devices GK, Tokyo (JP)

(72) Inventor: Isao Munechika, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 89 days.

(21) Appl. No.: 14/214,963

(22) Filed: Mar. 16, 2014

(65) Prior Publication Data

US 2014/0292688 A1 Oct. 2, 2014

(30) Foreign Application Priority Data

Apr. 1, 2013 (JP) ................................. 2013-075835

(51) Int. Cl.
  *G06F 3/041* (2006.01)
  *G09G 5/00* (2006.01)
  *G09G 5/12* (2006.01)

(52) U.S. Cl.
  CPC .............. *G06F 3/0416* (2013.01); *G09G 5/001* (2013.01); *G09G 5/12* (2013.01)

(58) Field of Classification Search
  CPC ..... G06F 3/044; G06F 3/0412; G06F 3/0416; G09G 5/001; G09G 5/12
  USPC ................... 345/173, 174, 204–214, 690–699
  See application file for complete search history.

(56) References Cited

U.S. PATENT DOCUMENTS

| 8,878,802 | B2 * | 11/2014 | Azumi et al. ................. 345/173 |
| 2008/0062139 | A1 * | 3/2008 | Hotelling et al. ............. 345/173 |
| 2011/0267296 | A1 * | 11/2011 | Noguchi et al. .............. 345/173 |
| 2012/0056835 | A1 * | 3/2012 | Choo et al. ................... 345/173 |
| 2013/0082954 | A1 * | 4/2013 | Azumi et al. ................. 345/173 |
| 2013/0234954 | A1 * | 9/2013 | Koide ........................... 345/173 |
| 2013/0328796 | A1 * | 12/2013 | Al-Dahle et al. ............. 345/173 |
| 2013/0328797 | A1 * | 12/2013 | Al-Dahle et al. ............. 345/173 |
| 2014/0253525 | A1 * | 9/2014 | Munechika .......... G09G 3/3611 345/204 |

FOREIGN PATENT DOCUMENTS

JP 2012-059265 A 3/2012

* cited by examiner

*Primary Examiner* — Dmitriy Bolotin
(74) *Attorney, Agent, or Firm* — Miles & Stockbridge P.C.

(57) ABSTRACT

The driver IC includes: a control circuit operable to perform control for creating the timing of detection by a touch panel in a non-display drive period during which the action of a drive circuit remains stopped, and for creating a display drive period during which the drive circuit drives the display panel, and the non-display drive period; and a data RAM operable to hold display data of more than one display line, but smaller than one display frame in capacity. The control circuit performs control for alternately creating the display and non-display drive periods by repeating a memory-addressing operation for writing display data supplied from outside into the RAM and reading the display data from the RAM at a speed faster than the writing speed to provide the read data to the drive circuit two or more times in a period of one display frame according to a wraparound method.

17 Claims, 11 Drawing Sheets

(A)

(B)

(C)

DRIVER IC AND DISPLAY DEVICE

CROSS-REFERENCE TO RELATED APPLICATIONS

The Present application claims priority from Japanese application JP 2013-075835 filed on Apr. 1, 2013, the content of which is hereby incorporated by reference into this application.

BACKGROUND

The present invention relates to a driver IC operable to alternately generate a display drive period and a non-display drive period to drive a display panel, and a technique useful in application to e.g. drive control of a panel module having a touch panel incorporated in a display panel.

Driver ICs operable to drive a display panel include a driver IC having a data RAM for display which is capable of temporarily holding one frame of image data. In the case of displaying a still image, successive transmission of the image data by a host processor can be stopped by displaying the image while reading out one frame of image data already accumulated in a data RAM and thus, both the power consumed by a display panel and the load to the host processor required for transmission of the image data can be reduced actually.

If such arrangement does not need to be made at all, it is not required to have a data RAM which would occupy a large area in a driver IC.

Further, in case that any attempt is made to reduce the load to a host processor while the chip footprint of a data RAM is reduced, a driver IC having a data RAM (partial RAM) for display having only several display lines of memory capacity smaller than one frame may be arranged so that it always uses a host processor to transmit display data for image data of a display region with a high update frequency, whereas for image data of a display region with a low update frequency, it causes the host processor to perform the display thereof while reading out data in a partial RAM. The arrangement like this allows the reduction in the amount of data transmission by the host processor for displaying portions of a low display update frequency, such as receive condition and status fields in a portable telephone or the like.

Considering the fact that a panel module having a display panel and a touch panel incorporated in the display panel is used frequently, it is preferable to perform the touch detection in a period during which the display driving remains stopped. This is because action noise caused at the time of display driving worsens the touch detection accuracy.

For instance, in the Japanese Unexamined Patent Publication No. JP-A-2012-59265 in view of this, the driver IC is arranged to have a data RAM with a capacity as large as one frame, intermittently display an image in blocks composed of several lines, and perform a touch sensing action in a period during which a display-drive output from the drive circuit remains stopped, whereby a high touch detection accuracy is achieved. In order to drive a display panel in blocks according to a time-sharing method like this, image data are stored, in blocks, in a data RAM with a capacity as large as one frame.

SUMMARY

The inventor made a study on the means for performing a touch detection during a non-display drive period corresponding to a display drive period to increase the touch detection accuracy in a driver IC having a data RAM such as a partial RAM.

According to the findings thereof, the patent document JP-A-2012-59265 discloses that image data should be stored in a memory in blocks for driving a display panel in groups of blocks in a time-sharing method and in this case, the memory is considered to be a memory of one-frame capacity. The control in which memory addresses are created in blocks by a wraparound method is a requisite for use of a partial memory, which is not taken into account at all in JP-A-2012-59265. The display device according to JP-A-2012-59265 no more than uses a data RAM with a capacity as large as one frame to perform the display driving and the non-display driving and therefore, neither the circuit scale nor chip size of the driver IC can be reduced because the display device must have a data RAM with a capacity as large as one frame.

In contrast, a driver IC which has no data RAM for display uses a host processor to intermittently transmit display data to create a non-display drive period during which the display driving is not performed, and conducts a touch sensing in the non-display drive period. For instance, display data transmitted from the host processor e.g. in words or other units, and latched by a line latch in each display line cycle will be immediately used by the drive circuit for driving in the subsequent display line cycle. To create a non-display drive period in this way, it is necessary to make the host processor intermittently transmit display data, and such timing control further increases the load to the host processor. If the increase in the load is not permissible, it becomes necessary to arrange the driver IC so as to have a data RAM. Consequently, it is impossible to meet both the requirement for reducing the chip size and the requirement for lightening the load to the host processor.

It is an object of the invention to increase the accuracy of touch detection while satisfying both the requirement of the reduction in chip size and the requirement of lightening of the load on a host processor.

The above and other object of the invention and novel features thereof will become apparent from the description hereof and the accompanying drawings.

Of the embodiments herein disclosed, the representative embodiment will be briefly outlined below.

The driver IC includes: a control circuit operable to perform control for creating the timing of detection by a touch panel in a non-display drive period during which the action of a drive circuit remains stopped, and for creating a display drive period during which the drive circuit drives the display panel, and the non-display drive period; and a data RAM operable to hold display data of more than one display line, but smaller than one display frame in capacity. The control circuit performs control for alternately creating the display and non-display drive periods by repeating a memory-addressing operation for writing display data supplied from outside into the data RAM and reading the display data from the RAM at a speed faster than the writing speed to provide the read data to the drive circuit two or more times in a period of one display frame according to a wraparound method.

According to the embodiment like this, the need for arranging a driver IC having a data RAM with a capacity as large as one frame is eliminated and thus, the chip size can be reduced. The driver IC having a data RAM operable to hold display data of more than one display line, but smaller than one display frame in capacity is not required to synchronously control the display data transfer from/to the host processor and the stop thereof in the display drive period and the non-display drive period and therefore, the load to the host processor can be lightened. The memory-addressing operation for writing display data into the data RAM and reading the written display data from the data RAM to provide the read data to the drive circuit is repeated two or more times in a period of one display frame according to a wraparound method and as such, the display drive period and the non-display drive period can be created alternately even in the case of using a data RAM of a capacity smaller than one display frame.

Of the embodiment herein disclosed, the representative embodiment brings about the effect as briefly described below.

In other words, the touch detection accuracy can be increased while the requirements, i.e. the reduction in chip size and the lightening of the load to the host processor are both satisfied.

DETAILED DESCRIPTION

1. Summary of the Embodiments

Figure 1:
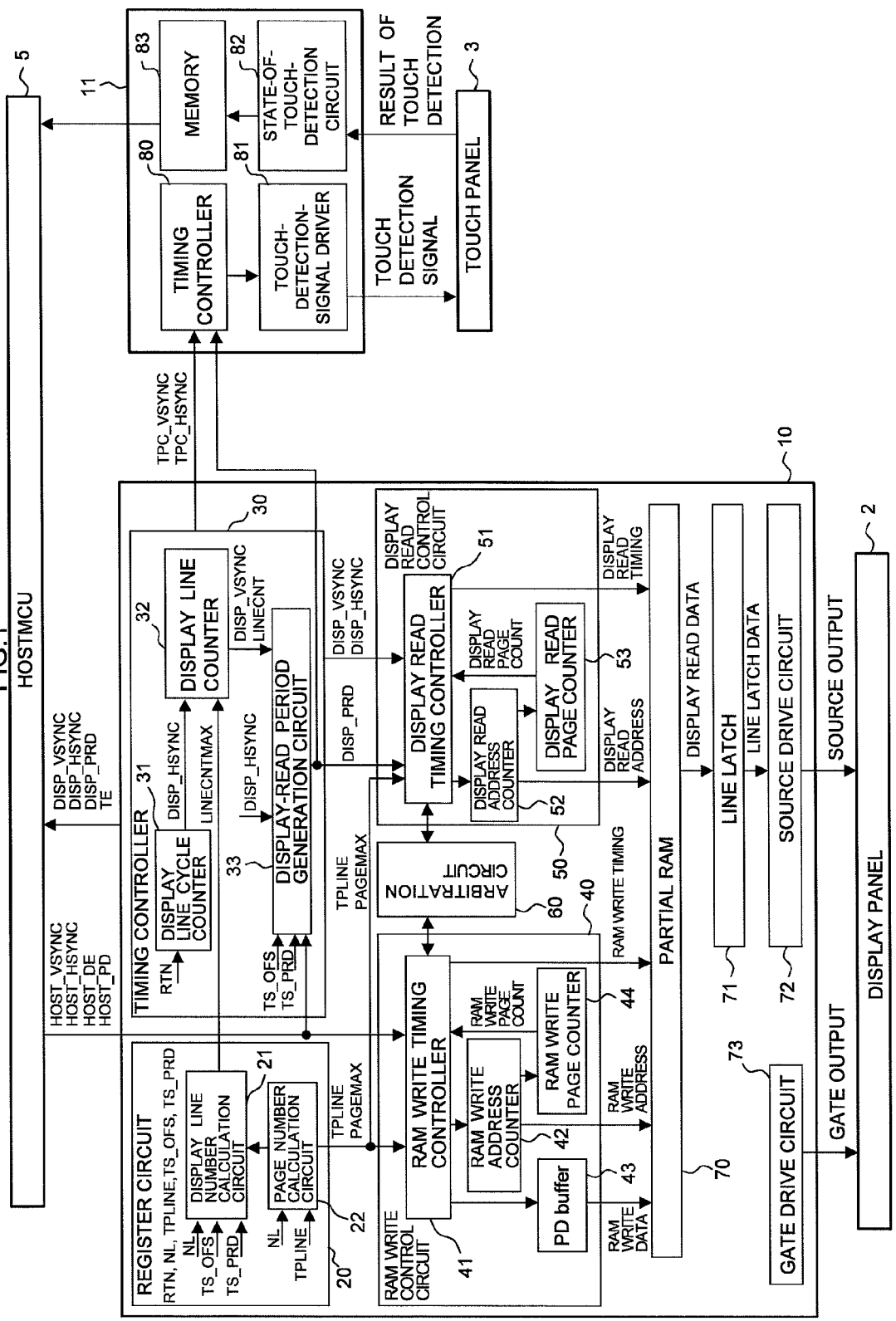
FIG. 1 is a block diagram showing the structure of a display driver.

First, summary of representative embodiments of the invention disclosed in the application will be described. Reference numerals in drawings in parentheses referred to in description of the summary of the representative embodiments just donote components included in the concept of the components to which the reference numerals are designated.

[1] <Alternating Creation of the Display Drive Period and the Non-Display Drive Period by Reading Display Data at a Speed Faster than the Writing Speed>

The driver IC (4) which controls the activation of a display panel (2) and the detection timing of a touch panel (3) has: a drive circuit (72) operable to activate the display panel in a display drive period; a control circuit (20-60, and 20A-50A) operable to create the detection timing of the touch panel in a non-display drive period during which the action of the drive circuit remains stopped, and to create the display drive period and the non-display drive period; and a data RAM (70, 70A) operable to hold display data of more than one display line, but smaller than one display frame in capacity. The control circuit performs the control for alternately creating the display drive period and the non-display drive period by repeating a memory-addressing operation for writing display data supplied from outside into the data RAM and reading the display data from the data RAM at a speed faster than the writing speed to provide the read data to the drive circuit two or more times in a period of one display frame according to a wraparound method.

According to the embodiment like this, the driver IC is not required to have a data RAM with a capacity as large as one frame and therefore, the chip size becomes smaller. The driver IC having a data RAM operable to hold display data of more than one display line, but smaller than one display frame in capacity is not required to synchronously control the display data transfer from/to the host processor and the stop thereof in the display drive period and the non-display drive period and therefore, the load to the host processor can be lightened. The memory-addressing operation for writing display data into the data RAM and reading the written display data from the data RAM to provide the read data to the drive circuit is repeated two or more times in a period of one display frame according to a wraparound method and as such, the display drive period and the non-display drive period can be created alternately even in the case of using a data RAM of a capacity smaller than one display frame. Therefore, the touch detection accuracy can be increased while meeting both the requirement for reducing the chip size and the requirement for lightening the load to the host processor.

[2] <Specifying the Display Drive Period and the Non-Display Drive Period>

In the driver IC as described in [1], the control circuit has a register circuit (20, 20A) for rewritably holding touch interval period data (TPLINE) for controlling an addressing range of the memory-addressing operation to be repeated according to the wraparound method within a range of a number of display lines comparable to up to a maximum memory capacity of the data RAM.

According to the embodiment like this, it becomes possible to flexibly cope with various structures meeting the requirements for the display resolution of a display panel and the detection resolution of a touch panel.

[3] <Alternating Creation of the Display Drive Period And the Non-Display Drive Period for Each Page>

In the driver IC as described in [2], the control circuit handles, as a page, data of a data size of a number of display lines comparable to up to a maximum memory capacity of the data RAM. The control circuit has: a write address counter circuit (40, 40A) which creates a page-write address for each page in each cycle of a first frame synchronizing signal from outside, and creates an in-page line-write address for each page; and a read address counter circuit (50, 50A) which creates a page-read address for each page in each cycle of a second frame synchronizing signal for display action, and creates an in-page line-read address for each page. The control circuit creates the display drive period and the non-display drive period for each page-read address alternately, creates a line-read address in the display drive period, and stops the creation of the line-read address in the non-display drive period.

According to the embodiment like this, it is possible to relatively readily materialize a form for repeating the memory-addressing operation for writing display data into the data RAM and reading the written display data therefrom to provide the read data to the drive circuit two or more times in a period of one display frame according to the wraparound method.

[4] <Starting the Read at a Time Delayed from the Start of Write of Display Data and Ending the Read after the End of the Write>

In the driver IC as described in [3], the control circuit starts to read display data from the data RAM with a timing delayed from a timing of starting to write display data into the data RAM by a predetermined period (TS_OFS+TS_PRD) for each page-write address, and the read action is ended after the end of the write to each page-write address.

According to the embodiment like this, duplicate use of more than one access address is avoided in the write to the data RAM for each page, and thus a smooth read can be performed.

[5] <Touch-Detection-Start-Line-Number Data (TS_OFS) and Display-Read-Start-Line-Number Data (TS_PRD)>

In the driver IC as described in [4], the register circuit further rewritably holds touch-detection-start-line-number data (TS_OFS) for controlling the number of display lines between the start of write to a write address of the top in a page and the start of touch detection, and display-read-start-line-number data (TS_PRD) for controlling the number of display lines between the position of a display line number decided by the touch-detection-start-line-number data and the start of display read after execution of touch detection, and the predetermined period is determined by a sum of the touch-detection-start-line-number data and the display-read-start-line-number data.

According to the embodiment like this, the touch detection period (non-display drive period) and the display drive period can be defined so that it can be varied with respect to the start of write to the data RAM in pages.

[6] <Line Counter for Display Lines>

In the driver IC as described in [5], the control circuit has a line counter (32) which counts, for each display frame, display lines in each display line cycle after start of write to a write address of a top of a top page, and the control circuit makes a judgment on a line number coming from the ouch detection line number data, and a line number coming from the display-read-start-line-number data based on a count value of the line counter.

According to the embodiment like this, the following can be realized relatively readily by use of a count value of the line counter: to avoid duplicate use among access addresses for write to/read from the data RAM for each page, as described in [4]; and to define a touch detection period variably with respect to the start of write on the data RAM for each page as described in [5].

[7] <Priority is Given to a Write Request with a Read Request Conflicting Therewith>

In the driver IC as described in [4], the unit of data access according to a read request to the data RAM is made larger than the unit of data access according to a write request. The control circuit has an arbitration circuit (60), and in the condition as described above, the arbitration circuit gives priority to the write request with the read request conflict therewith.

According to the embodiment like this, the synchronization control by which the write from the host processor is suspended is not required at all. In case that the data RAM is one having a perfect dual port, such arbitration is not required. However, in that case, the circuit scale of the data RAM becomes twice, which is far from the truth.

[8] <Access Units for Write and Read>

In the driver IC as described in [7], the access unit according to the read request is the number of parallel data of one display line, and the access unit according to the write request is the number of parallel data of bus access.

According to the embodiment like this, even if priority is given to a write request with a read request conflicting therewith, the readout in display lines is performed after the write in bus accesses and as such, there is not the possibility of failing to read display data which has been already written in the data RAM on an individual page basis at all.

[9] <Alternate Switching Between Write and Read of Display Data on Memory Banks>

In the driver IC as described in [2], the data RAM (70A) has memory banks (BANKA, BANKB). The control circuit reads data from one memory bank while writing the other memory bank, and alternately switches between the memory bank targeted for write and the memory bank targeted for read.

According to the embodiment like this, the conflict between write and read actions on one memory bank can be readily avoided by means of switching between the memory banks for write and read.

[10] <Unnecessity for Arbitration Circuit in Write and Read>

In the driver IC as described in [9], the control circuit (20A-50A) sets one of the pair of memory banks as a memory bank targeted for write in a first non-display drive period for each display frame, and sets the other memory bank as a memory bank targeted for read in a first display drive period, and the control circuit switches between the memory bank targeted for write and the memory bank targeted for read at each page switching.

According to the embodiment like this, write and read actions on one memory bank never conflict with each other and as such, the need for the arbitration circuit as described in [7] is eliminated.

[11] <Display Line Cycle Data (RTN), and Display Line Number Data (NL)>

In the driver IC as described in [3], the register circuit rewritably holds: display line cycle data (RTN) for controlling a display line cycle of the display panel, which is a switching cycle of a display line to be driven; and display line number data (NL) for controlling the number of display lines of the display panel to be driven.

According to the embodiment like this, the driver IC hereof can readily adapt to even various types of display panels which are different in the display line cycle and the number of display lines.

[12] <Touch Detection Circuit Line Number Data (TS_OFS), and Display-Read-Start-Line-Number Data (TS_PRD) in the Case of Alternately Creating the Display Drive Period and Non-Display Drive Period for Each Page>

In the driver IC as described in [11], the control circuit (20-60) handles, as a page, data of a data size of a number of display lines comparable to up to a maximum memory capacity of the data RAM. The control circuit has: a write address counter circuit (40) which creates a page-write address for each page in each cycle of a first frame synchronizing signal from outside, and creates an in-page line-write address for each page; and a read address counter circuit (50) which creates a page-read address for each page in each cycle of a second frame synchronizing signal for display action, and creates an in-page line-read address for each page. The control circuit creates the display drive period and the non-display drive period for each page-read address alternately, creates a line-read address in the display drive period, and stops the creation of the line-read address in the non-display drive period. The register circuit (20) further rewritably holds touch-detection-start-line-number data (TS_OFS) for controlling the number of display lines between the start of write to a write address of the top in a page and the start of touch detection, and display-read-start-line-number data (TS_PRD) for controlling the number of display lines between the position of a display line number decided by the touch-detection-start-line-number data and the start of display read after execution of touch detection.

According to the embodiment like this, it is possible to relatively readily materialize a form for repeating the memory-addressing operation for writing display data into the data RAM and reading the written display data therefrom to provide the read data to the drive circuit two or more times in a period of one display frame according to the wraparound method. Further, the touch detection period (non-display drive period) and the display drive period can be defined so that it can be varied with respect to the start of write to the data RAM in pages.

[13] <Offset-Line-Number Data (TS_OFS), and Display-Read-Start-Line-Number Data (TS_PRD) in the Case of Using Memory Banks>

In the driver IC as described in [11], the data RAM (70A) has memory banks (BANKA, BANKB). The control circuit (20A-50A) reads data from one memory bank while writing the other memory bank, and alternately switches between the memory bank targeted for write and the memory bank targeted for read. At this time, the register circuit (20A) further rewritably holds: offset-line-number data (TS_OFS) for controlling an offset from the start of write to a write address at the top in a page by the number of display lines; and display-read-start-line-number data (TS_PRD) for controlling the number of display lines between a position of a display line number decided by the offset-line-number data and the start of the subsequent display read, provided that execution of touch detection is started with a display line when a display line number specified by the touch interval period data has been reached.

According to the embodiment like this, the conflict between write and read actions on one memory bank can be avoided by means of switching between the memory banks for write and read. In addition, the non-display drive period (touch detection period) and the display drive period can be variably set with respect to the write of a page top into the data RAM.

[14] <Line Counter for Display Lines>

In the driver IC as described in [12] or [13], the control circuit has a line counter (32) which counts, for each display frame, display lines in each display line cycle after start of write to a write address of a top of a top page. The control circuit makes judgment on the number of lines in a touch interval period coming from the touch interval period data, the number of lines coming from the touch-detection-line-number data, and the number of lines coming from the display-read-start-line-number data based on a count value of the line counter.

According to the embodiment like this, the following can be realized relatively readily by use of a count value of the line counter: to define a touch detection period variably with respect to the start of write on the data RAM for each page as described in [12]; to make possible to variably set the non-display drive period (touch detection period) with respect to the write of a page top into the data RAM as described; and to make possible to variably set the display drive period with respect to the read of a page top from the data RAM.

[15] <Alternating Creation of a Display Drive Period and a Non-Display Drive Period by Reading Display Data at a Speed Faster than a Writing Speed>

The display device includes a panel module (1) having a display panel (2) and a touch panel (3) incorporated in the display panel. The panel module further includes a driver IC (4) which performs the activation control of the display panel, and the detection control of the touch panel. The driver IC has: a drive circuit (72) operable to activate the display panel in a display drive period; a touch panel controller (11) operable to perform the detection control of the touch panel in a non-display drive period during which the action of the drive circuit remains stopped; a data RAM (70, 70A) operable to hold display data of more than one display line, but smaller than one display frame in capacity; and a control circuit (20 to 60, and 20A to 50A) operable to perform the control for alternately creating the display drive period and the non-display drive period by repeating a memory-addressing operation for writing display data supplied from outside into the data RAM and reading the display data from the data RAM at a speed faster than the writing speed to provide the read data to the drive circuit two or more times in a period of one display frame according to a wraparound method.

According to the embodiment like this, the driver IC is not required to have a data RAM with a capacity as large as one frame and therefore, its chip size becomes smaller, which contributes the reduction in panel module size. The driver IC having a data RAM operable to hold display data of more than one display line, but smaller than one display frame in capacity is not required to synchronously control the display data transfer from/to the host processor and the stop thereof in the display drive period and the non-display drive period and therefore, the load to the host processor can be lightened. The memory-addressing operation for writing display data into the data RAM and reading the written display data from the data RAM to provide the read data to the drive circuit is repeated two or more times in a period of one display frame according to a wraparound method and as such, the display drive period and the non-display drive period can be created alternately even in the case of using a data RAM of a capacity smaller than one display frame. Therefore, the touch detection accuracy can be increased while meeting both the requirement for reducing the chip size and the requirement for lightening the load to the host processor.

[16] <Alternating Creation of the Display Drive Period and the Non-Display Drive Period for Each Page>

In the driver IC as described in [15], the control circuit handles, as a page, data of a data size of a number of display lines comparable to up to a maximum memory capacity of the data RAM (70, 70A). Further, the control circuit has: a write address counter circuit (40, 40A) which creates a page-write address for each page in each cycle of a first frame synchronizing signal from outside, and creates an in-page line-write address for each page; and a read address counter circuit (50, 50A) which creates a page-read address for each page in each cycle of a second frame synchronizing signal for display action, and creates an in-page line-read address for each page. The control circuit creates the display drive period and the non-display drive period for each page-read address alternately, creates a line-read address in the display drive period, and stops the creation of the line-read address in the non-display drive period.

According to the embodiment like this, it is possible to relatively readily materialize a form for repeating the memory-addressing operation for writing display data into the data RAM and reading the written display data therefrom to provide the read data to the drive circuit two or more times in a period of one display frame according to the wraparound method.

[17] <Alternate Switching Between Display Data Write to and Read from Memory Banks>
Between Write and Read of Display Data on Memory Banks>

In the driver IC as described in [15], the data RAM (70A) has memory banks (BANKA, BANKB). The control circuit (20A-50A) reads data from one memory bank while writing the other memory bank, and alternately switches between the memory bank targeted for write and the memory bank targeted for read.

According to the embodiment like this, the conflict between write and read actions on one memory bank can be readily avoided by means of switching between the memory banks for write and read.

2. Further Detailed Description of the Embodiments
The embodiments will be described further in detail.
<<Display Device>>

Figure 2:
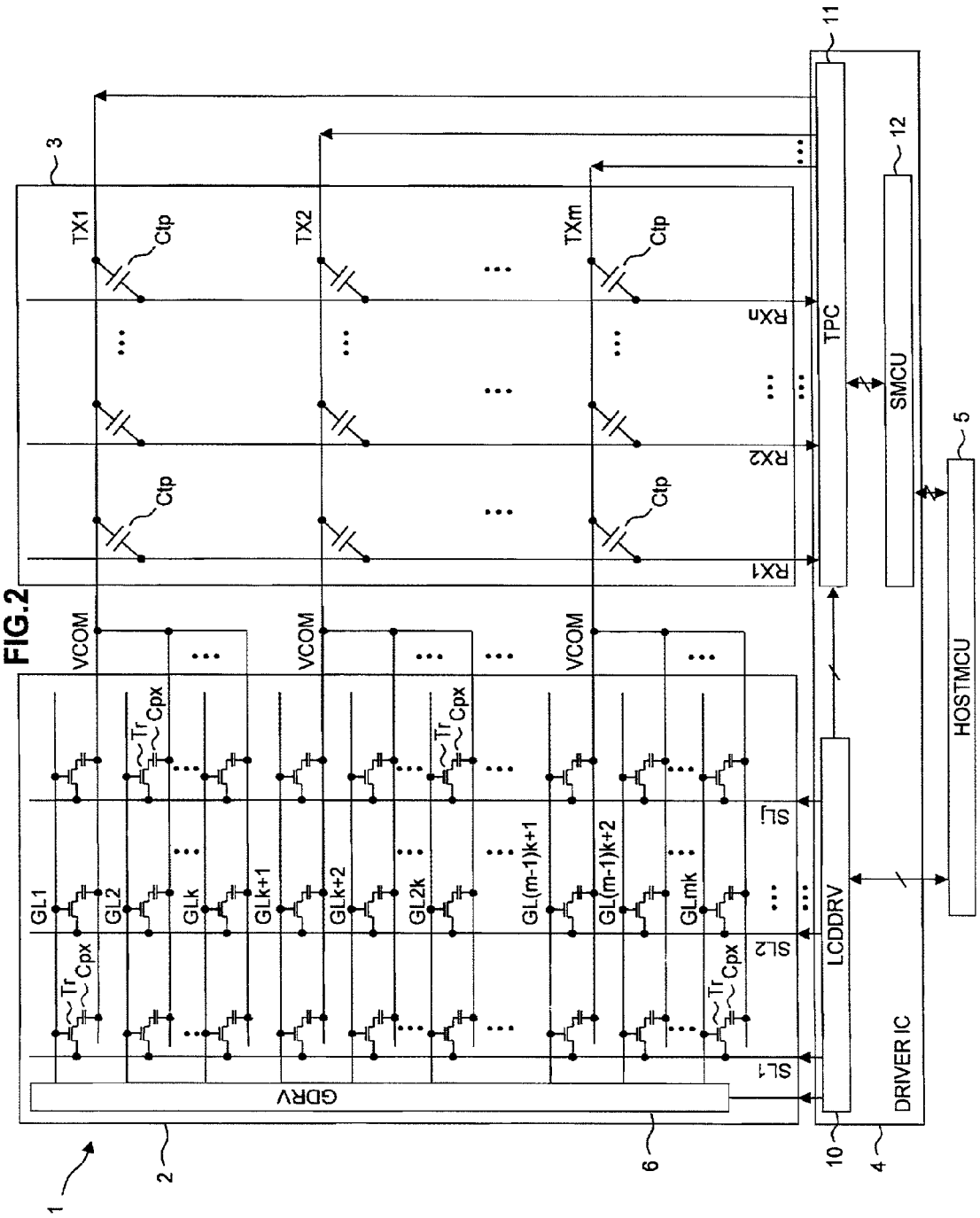
FIG. 2 is a block diagram showing, by example, a display device having a panel module and a driver IC operable to drive the panel module.

FIG. 2 shows, by example, a display device having a panel module 1 and a driver IC 4 operable to activate the panel module. The panel module 1 is arranged in a so-called in-cell form in which a touch panel 3 is incorporated in a display panel 2. For instance, the panel module includes a TFT-array substrate with TFTs and pixel electrodes arranged on a glass base like a matrix, and further includes a liquid crystal layer, a common electrode layer opposed to the pixel electrodes, a color filter, touch detection capacitances, touch-detection electrodes, a surface glass, etc. which are stacked on the TFT-array substrate. While in FIG. 2, the display panel 2 and the touch panel 3 are separately shown in left and right portions of the drawing for the sake of convenience, they are superposed on each other in reality.

As shown in FIG. 2, the display panel 2 has e.g. scan electrodes GL1 to GLmk (m and k are both a positive integer) and signal electrodes SL1 to SLj (j is a positive integer), which are arranged to intersect each other, and a thin-film transistor Tr arranged at each intersection point thereof and referred to as "TFT". The scan electrodes GL1 to GLmk are provided corresponding to gates of the thin-film transistors Tr; the signal electrodes SL1 to SLj are provided corresponding to sources of the thin-film transistors Tr; and a combination of one liquid crystal element and one storage capacitor (which is represented by one capacitor Cpx in the drawing) making a sub-pixel is connected between the drain of each thin-film transistor Tr and the common electrode VCOM, whereby pixels of the display panel are formed. Here, a line of pixels arrayed along each of the scan electrodes GL1 to GLmk is referred to as "display line". In display control, the scan electrodes GL1 to GLmk are driven sequentially. Then, the thin-film transistors Tr are turned ON in scan electrodes. In each thin-film transistor put in ON state, current is caused to flow between its source and drain, when signal voltages put on the sources through the signal electrodes SL1 to SLj are applied to the liquid crystal elements Cpx, whereby the state of the liquid crystal is controlled.

The touch panel 3 is of an electrostatic capacitance type, which has e.g. lots of touch detection capacitances Ctp formed like a matrix at intersection points of drive electrodes TX1 to TXm and detection electrodes RX1 to RXn arranged to intersect one another. Although no special restriction is intended, in the display device shown in FIG. 2 the common electrode is divided in m parts, which are assigned to groups of k display lines respectively and arranged to double as the corresponding drive electrodes TX1 to TXm, for slimming the panel module 1. On condition that the drive electrodes TX1 to TXm are driven sequentially and thus, potential changes arise on the detection electrodes RX1 to RXn through the touch detection capacitances Ctp, detection signals can be formed by integrating the potential changes for each of the detection electrodes RX1 to RXn. In case that a finger is brought close to the detection capacitances, the stray capacitance of the finger is combined with the detection capacitances Ctp, and thus the combined capacitance values become smaller. The touch panel is arranged to discriminate between the states of "being touched" and "being untouched" based on the differences of the detection signals according to the changes of the capacitance values. Because of using the touch panel 3 superposed on the liquid crystal panel 2, the operation can be determined from touch coordinates of the place where a touch operation is conducted on the touch panel 3 according to display on a screen of the liquid crystal panel 2.

The driver IC 4 serves as a controller or driver which performs the activation control of the display panel 2, and detection control of the touch panel 3. The driver IC 4 is mounted on the TFT substrate of the panel module in the form of COG (Chip on Glass) or the like. The driver IC 4 is connected with the host processor (HSTMCU) 5 of an information terminal device, e.g. a smart phone having the panel module 1 as a user interface and in this condition, the input and output of an action command, display data, touch detection coordinate data, etc. are performed between the driver IC 4 and the host processor 5.

Although no special restriction is intended, the driver IC 4 is arranged in the form of a semiconductor integrated circuit equipped with a display driver (LCDDRV) 10 and a touch panel controller (TPC) 11. The driver IC 4 arranged in the form of a semiconductor integrated circuit is formed on a substrate of a semiconductor such as monocrystalline silicon by e.g. the CMOS IC manufacturing technique. Although no special restriction is intended, in the embodiment of FIG. 2, the circuit serving to drive the scan electrodes GL1 to GLmk is provided in the liquid crystal panel 2 as the gate driver (GDRV) 6. The driver IC 4 drives the signal electrodes SL1 to SLj in synchronization with a frame synchronizing signal such as a vertical synchronizing signal, and supplies the gate driver IC 6 with the timing of driving the scan electrodes GL1 to GLmk and the like. The gate driver IC 6 drives the scan electrodes GL1 to GLmk according to the timing supplied from the driver IC 4.

The liquid crystal display driver 10 controls the display panel 2 differently depending on whether it is in a display-drive period or a non-display-drive period in one display frame period. For instance, the scan electrodes GL1 to GLmk are divided into m/i blocks in groups of k×i (i is a positive integer) electrodes, and the display-drive period is divided into m/i display-drive periods; the display driver drives k×i scan electrodes of the corresponding block sequentially in each of the resultant display-drive periods, and drives the signal electrodes SL1 to SLj by display data of the corresponding display line in line with the timing of driving the scan electrodes. The display driver 10 supplies the gate driver 6 with the timing of driving the scan electrodes of the corresponding block in a display drive period. Also, the display driver 10 stops driving the signal electrodes SL1 to SLj in a non-display-drive period, and then notifies the touch panel controller 11 that it is able to work for touch detection. In each non-display-drive period, the touch panel controller 11 sequentially drives a predetermined range of the drive electrodes TX1 to TXm, and integrates potential changes arising on the detection electrodes RX1 to RXn through the touch detection capacitances Ctp, thereby forming detection signals. Then, the touch panel controller supplies the detection signals thus obtained to the host processor 5.

In such process, the display driver 10 uses a RAM having a memory capacity of smaller than one display frame as a memory for temporarily holding display data to use for driving the signal electrodes SL1 to SLj, and repeats a memory-addressing operation for writing display data supplied from the host processor into RAM and reading the written data from the RAM at a speed faster than the writing speed according to a wraparound method two or more times in a period of one display frame, thereby performing the control for alternately creating the display drive period and the non-display drive period. The control function of the display driver will be described below in detail.

<<First Embodiment of the Display Driver >>

FIG. 1 shows, by example, the structure of the display driver 10. The display driver 10 has: a register circuit 20; a timing controller 30; a RAM write control circuit 40; a display-read control circuit 50; an arbitration circuit 60; a partial RAM 70; a line latch 71; a source drive circuit 72; and a gate drive circuit 73 operable to supply the gate driver IC 6 with a gate drive timing signal, etc.

The partial RAM 70 is an embodiment of the data RAM operable to hold display data of more than one display line, but smaller than one display frame.

The register circuit 20, the timing controller 30, the RAM write control circuit 40, the display-read control circuit 50 and the arbitration circuit 60 are included in an embodiment of the control circuit which performs the control for alternately creating the display drive period and the non-display drive period by repeating a memory-addressing operation for writing display data supplied from the host processor 5 into the partial RAM 70 and reading the written display data from the partial RAM 70 at a speed faster than the writing speed to provide the read data to the source drive circuit 72 two or more times in a period of one display frame according to a wraparound method.

The touch panel controller 11 has: a timing controller 80; a touch-detection-signal driver 81; a state-of-touch-detection circuit 82; and a memory 83. The touch-detection-signal driver 81 drives the drive electrodes TX1 to TXm sequentially. The state-of-touch-detection circuit 82 is a circuit which integrates potential changes arising on the detection electrodes RX1 to RXn through the touch detection capacitances Ctp for each of the detection electrodes RX1 to RXn to create detection data while the touch-detection-signal driver 81 is driving the drive electrodes TX1 to TXm sequentially. The memory 83 accumulates the detection data, and the detection data so accumulated are supplied for calculation of touch coordinates by the host processor 5.

Figure 3:
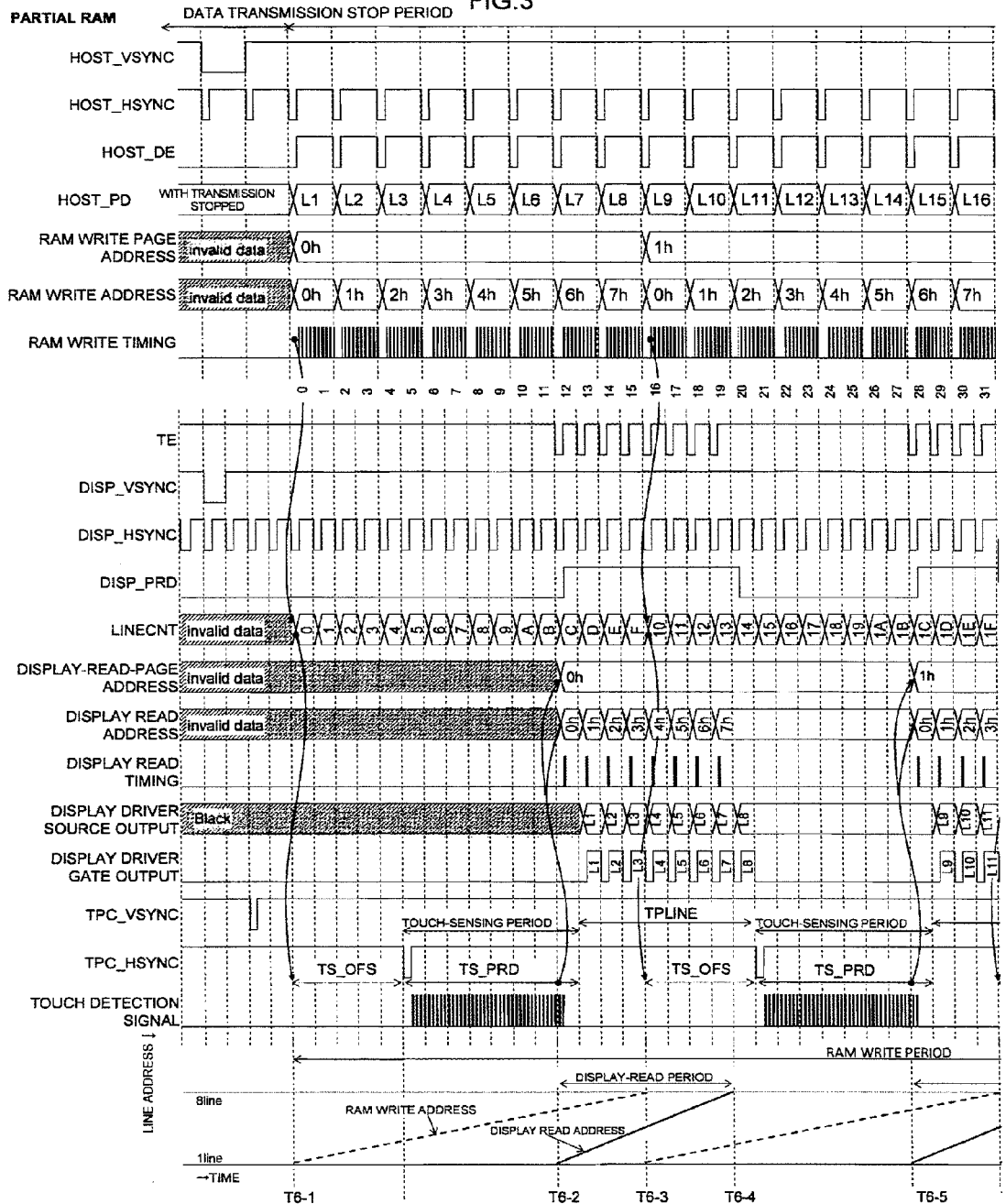
FIG. 3 is a timing diagram showing, by example, the first half portion of the timing of action control by the display driver of FIG. 1.
Figure 4:
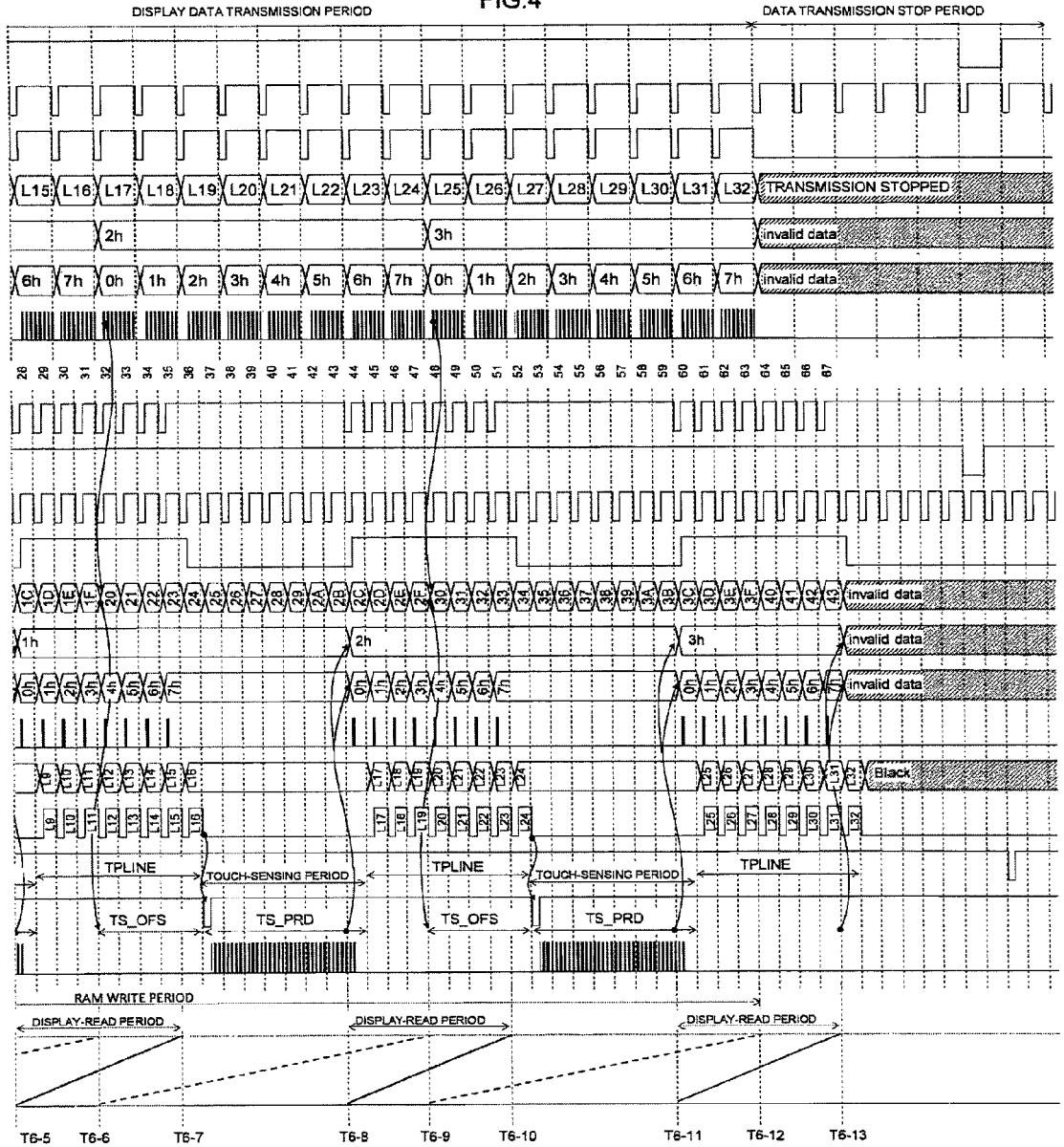
FIG. 4 is a timing diagram showing, by example, the latter half portion of the timing of action control by the display driver of FIG. 1.

FIGS. 3 and 4 show, by example, the timing of action control by the display driver in combination. The timing diagrams of FIGS. 3 and 4 are drawn so as to overlap to connect with each other around Time T6-5. In FIGS. 3 and 4, count values and address values, which are represented by the count value LINECNT and the display read address, are assumed to be digital values starting with zero (0), and these values are shown in the drawings. Further, assuming that display lines are each labeled with a letter with a numeral starting from one (1), the numerals for identifying transfer data and driver outputs are shown in the drawing corresponding to the numerals assigned to the display lines.

The detail of the display driver 10 will be described with reference to FIGS. 1, 3 and 4. In an embodiment taken here, the display panel 2 has 32 display lines, which are also referred to as "lines" simply, and the display driver 10 is provided with a partial RAM 70 of eight-line capacity.

The write and read on the partial RAM 70 of eight-line capacity are performed in units of eight-line pages. The RAM write control circuit 40 and the display-read control circuit 50 create an access address of the partial RAM for each page.

The RAM write control circuit 40 has: a RAM-write timing controller 41; a RAM-write address counter 42; a PD buffer 43; and a RAM-write page counter 44. The RAM-write timing controller 41 accepts the inputs of a vertical synchronizing signal HOST_VSYNC, a horizontal synchronizing signal HOST_HSYNC, a data enable signal HOST DE, and a display dataHOST_PD from the host processor 5, and performs the write control of the partial RAM 70. The high-order address of the RAM write address (the write-access address of the partial RAM 70) is a count value (RAM write-page address; page-write address) of the RAM-write page counter 44, and its low-order address is a count value (RAM write address) of the RAM-write address counter 42.

The display-read control circuit 50 has a display-read-timing controller 51; a display read address counter 52; and a display-read-page counter 53. The display-read-timing controller 51 accepts the inputs of a vertical synchronizing signal DISP_VSYNC, a horizontal synchronizing signal DISP_HSYNC, a line count value LINECNT, and a display-drive-period signal DISP_PRD from the timing controller 30, and performs the read control of the partial RAM 70. The high-order address of the RAM read address (the read-access address of the partial RAM 70) is a count value (display-read-page address; page-read address) of the display-read-page counter 53, and its low-order address is a count value (display read address) of the display read address counter 52.

The RAM write and display read are asynchronous, and the arbitration circuit 60 arbitrates the competition between a write-access request and a read-access request to the partial RAM 70. For instance, the arbitration circuit 60 puts higher priority on the write request from the RAM-write timing controller 41 than that on the read request from the display-read-timing controller 51, and permits the write request. In the timing control by the arbitration circuit 60, neither the write nor the read is cancelled.

The register circuit 20 rewritably holds touch-detection-start-line-number data (TS_OFS), display-read-start-line-number data (TS_PRD), display line cycle data (RTN), display line number data (NL), and touch interval period data (TPLINE). The overwrite of these data is performed by e.g. the host processor 5.

The touch-detection-start-line-number data (TS_OFS) is control data for controlling a display line number after the start of write to a write address of the top of a page until the start of touch detection. The display-read-start-line-number data (TS_PRD) is control data for controlling a display line number after the execution of touch detection from a position of a display line number depending on touch-detection-start-line-number data until the start of display read. As is clear from FIGS. 3 and 4, the read of display data from the partial RAM 70 is started with the timing delayed from the timing of starting writing display data to the partial RAM 70 by a predetermined period (TS_OFS+TS_PRD) for each RAM write-page address (page-write address). The time when the read thus started is terminated is after the end of the write at each write address of the page in process.

The display line cycle data (RTN) is control data for controlling the display line cycle of the display panel, which is the cycle of switching the display line to be driven.

The display line number data (NL) is control data for controlling the number of display lines of the display panel to be driven.

The touch interval period data (TPLINE) is control data for controlling the number of display lines grouped to make a space between touch sensing periods.

The page-number-calculation circuit 22 calculates a RAM write page number (=display read page number) PAGEMAX. In case that a remainder is left as a result of calculation of the formula NL/TPLINE, one page is added, and the remainder is assigned to the final page thus added. Alternatively, the remainder may be assigned to two or more pages in units of several lines. That is, the RAM write page number PAGEMAX is expressed as follows:

PAGEMAX=(NL/TPLINE)+{+1 in case that a remainder is left as a result of calculation of (NL/TPLINE)}.

The display-line-number-calculation circuit 21 calculates a maximum count value LINECNTMAX of the line count value LINECNT counted by the display line cycle counter 32 in one frame. That is, the maximum count value LINECNTMAX is expressed as follows:

LINECNTMAX=NL+(TS_FS+TS_PRD)×PAGEMAX+TPLINE.

The display line cycle counter 31 outputs a horizontal synchronizing signal DISP_HSYNC of a cycle according to cycle data (RTN). The display line counter 32 counts the clock number of the horizontal synchronizing signal DISP_HSYNC until the maximum count value LINECNTMAX is reached after start of write to the partial RAM 70 in units of frames to create a display line count value LINECNT. The display-read-period-generation circuit 33 generates a display-drive-period signal DISP_PRD based on the data TS_OFS, TS_PRD, DISP_HSYNC, LINECNT.

The display-read-timing controller 51 starts the display output of data held in the partial RAM 70 after the predetermined period TS_OFS+TS_PRD from the start of data write of the top line of each page on the partial RAM 70, and repeats, a number of times depending on +PAGEMAX, the action of performing display read for the period TPLINE and then keep the display read stopped for the period TS_OFS+TS_PRD. The display-read-timing controller 51 enables display driving by reading display data from the partial RAM 70 at a speed sufficiently faster than the speed of the host processor 5 writing the display data. The faster the display read speed is in comparison to a RAM writing speed, the more the touch-sensing period TS_PRD can be ensured, whereas a display read address to be subjected to a delayed address counting must not go ahead of a RAM write address. As to the read of display data, the display action is performed intermittently while alternately repeating the display-read-stop period and the display-read period so that the display read address and the display-write address as shown in FIG. 3 and FIG. 4 do not cross each other.

The partial RAM is smaller than the image size of one frame in capacity, and is arranged so that display data write and display read can be performed thereon; the number of lines of the partial RAM 70 used for a page, and arranged so that memory write and readout can be performed on the whole memory two or more times in one frame by counters 42 and 44 for RAM write and counters 52 and 53 for display read can be adjusted by a set value of TGPLINE.

In the embodiment of FIGS. 3 and 4, display data continuously transmitted by the host processor 5 between T6-1 and T6-12 in the drawings are accumulated in the partial RAM 70 in the display driver 10 in turn. The RAM write address of the partial RAM 70 is incremented from 0 h to the maximum 7 h. Then, the RAM write address is reset and again incremented from 0 h. The counters 42 and 44 for RAM write are reset by the vertical synchronizing signal HOST_VSYNC. The write to the partial RAM 70 is continued to the line number (which is equal to a line number specified by TPLINE) of the partial RAM 70 in the final page of PAGEMAX. In case that the event of display data write is caused before reaching a subsequent frame, the write data is ignored.

In the embodiment of FIGS. 3 and 4, data read from the partial RAM 70 is performed intermittently in the order of a display-read-stop period and a display-read period two or more times for each frame. In FIGS. 3 and 4, the periods of the time T6-1 to T6-2, T6-4 to T6-5, T6-7 to T6-8, and T6-10 to T6-11 are made the display-read-stop period. The periods of the time T6-2 to T6-4, T6-5 to T6-7, T6-8 to T6-10, and T6-11 to T6-13 are made the display-read period. The display-read-stop period corresponds to the non-display drive period. Specifically, of display read data read out from the partial RAM 70, only one line is synchronized in the line latch 71, and then the display read data are supplied to the source drive circuit 72 to activate the display panel 2. From the start of readout from the partial RAM 70 to the start of activation of the source drive circuit 72, an action delay as long as one cycle of the horizontal synchronizing signal DISP_HSYNC is caused. Therefore, there is an action delay as long as one cycle of the horizontal synchronizing signal DISP_HSYNC between the display-read-stop period and the non-display drive period in start timing. Incidentally, the display drive period corresponds to the period of the touch interval period data TPLINE. In this way, while alternately repeating the non-display driving and the display driving, the display driver 10 causes the source drive circuit 72 to drive the signal electrodes SL1 to SLj of the display panel 2, and causes the gate drive circuit 73 to alternately repeat the activation and stop of the gate driver in line with the driving of the signal electrodes SL1 to SLj and the stop of the driving thereof.

The display driver 10 returns the host processor 5 a display frame, vertical and horizontal synchronizing signals DISP_VSYNC and DISP_HSYNC specifying a display line, a display-drive-period signal DISP_PRD specifying a display period, and a timing signal TE which is toggled with the display read timing of the partial RAM 70. The host processor 5 is capable of transmitting display data by making reference to these signals as required while checking the display read timing of the display driver 10.

The driver IC 10 of FIG. 1 brings about the effect and advantage as described below.

Figure 5:
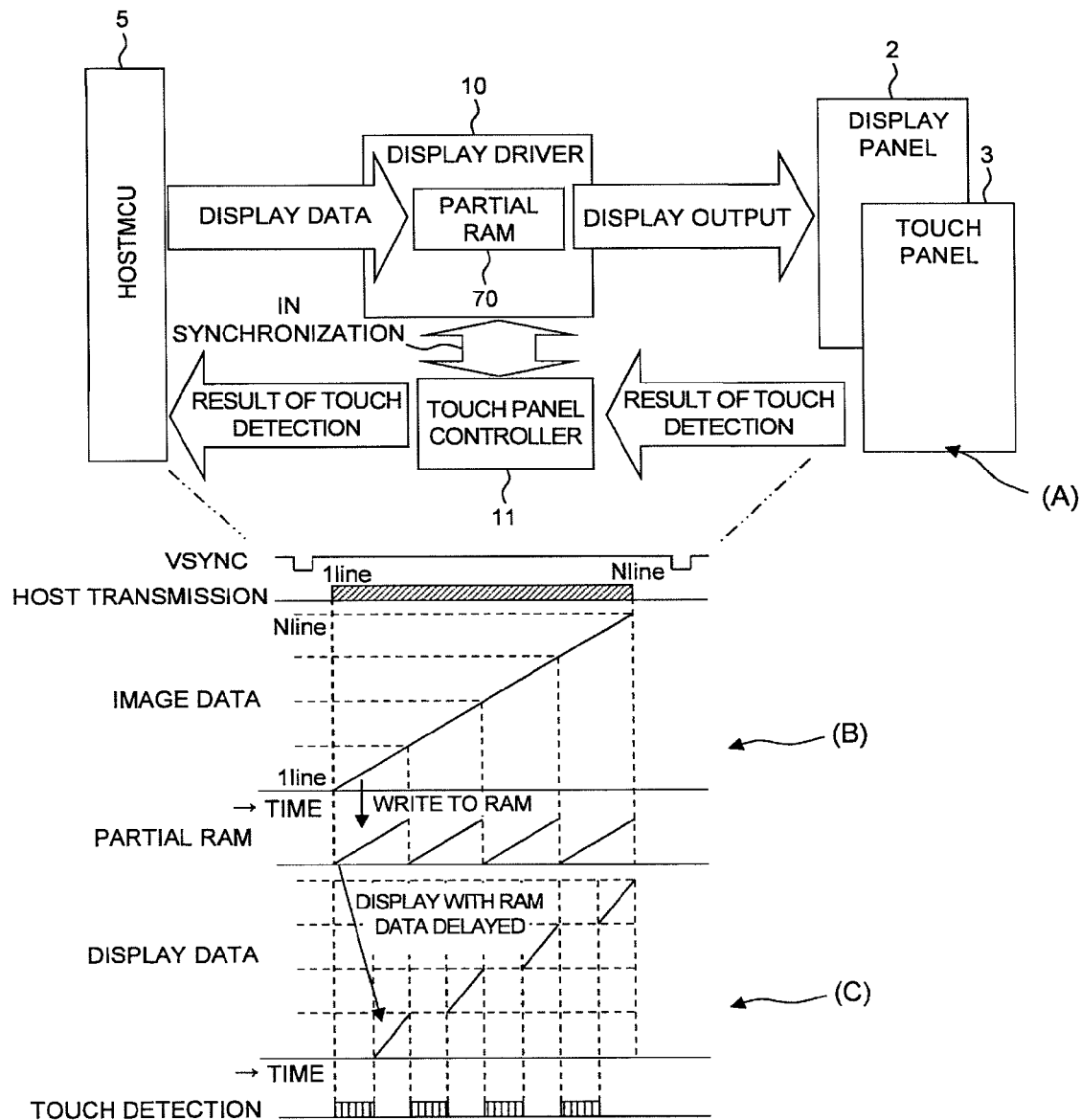
FIG. 5 is an explanatory diagram showing the structure and function of the display driver of FIG. 1 in combination.

(1) The display drive period and the non-display drive period are alternately created by repeating the memory-addressing operation for writing display data into the partial RAM 70 and reading the written display data from the partial RAM 70 at a speed faster than the writing speed to provide the read data to the source drive circuit 72 two or more times in a period of one display frame according to a wraparound method. This driving form is schematically shown by a combination of 5A to 5C in FIG. 5.

Figure 6:
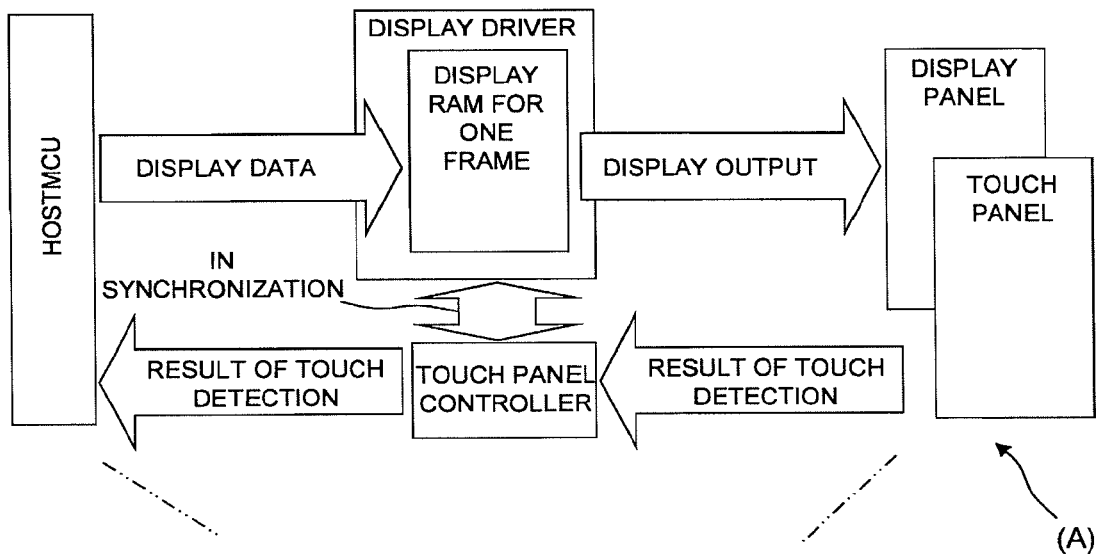
FIG. 6 is an explanatory diagram schematically showing a driving form for alternately creating a display drive period and a non-display drive period by use of RAM with a capacity as large as one frame.
Figure 6:
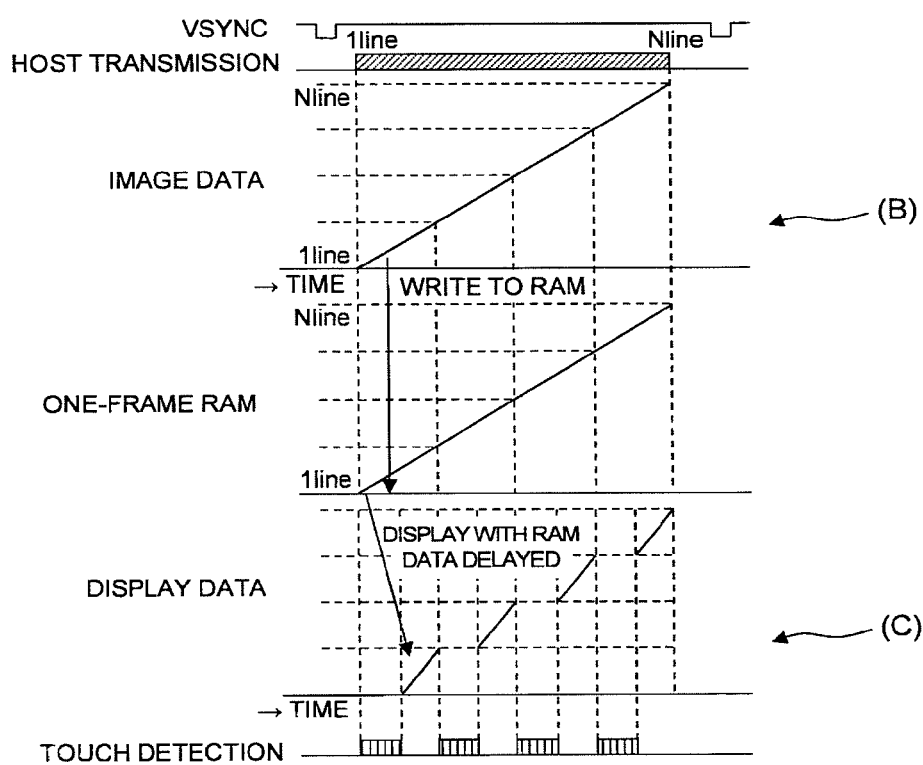

According to the arrangement like this, it becomes unnecessary for the driver IC to have a RAM with a capacity as large as one frame and therefore, the chip size becomes smaller. The driving form for alternately creating the display drive period and the non-display drive period by use of RAM with a capacity as large as one frame is schematically shown by a combination of 6A to 6C in FIG. 6.

Figure 7:
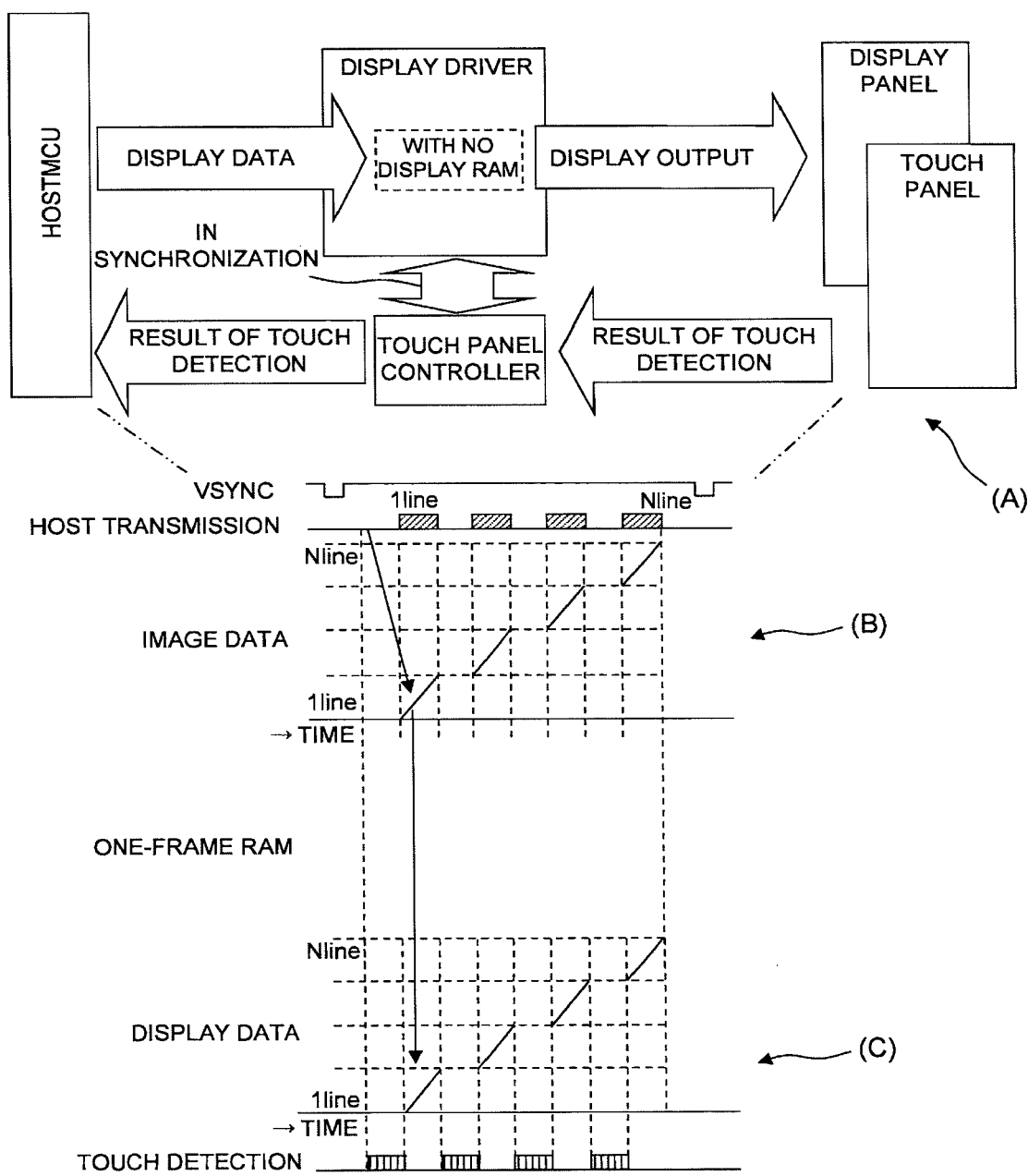
FIG. 7 is an explanatory diagram schematically showing a driving form for alternately creating the display drive period and the non-display drive period by performing synchronization control of display data transfer from/to a host processor 5 and the stop thereof instead of RAM.

The driver IC having a partial RAM 70 operable to hold display data of more than one display line, but smaller than one display frame in capacity is not required to synchronously control the display data transfer from/to the host processor 5 and the stop thereof in the display drive period and the non-display drive period and therefore, the load to the host processor 5 can be lightened. The driving form for alternately creating the display drive period and the non-display drive period by synchronously controlling the display data transfer to the host processor 5 and the stop thereof instead of RAM is schematically shown by a combination of 7A to 7C in FIG. 7.

The memory-addressing operation for writing display data into the partial RAM 70 and reading the written display data from the partial RAM to provide the read data to the source drive circuit 72 is repeated two or more times in a period of one display frame according to a wraparound method and as such, the display drive period and the non-display drive period can be created alternately even in the case of using the partial RAM 70 of a capacity smaller than one display frame. Therefore, the touch detection accuracy can be increased while meeting both the requirement for reducing the chip size and the requirement for lightening the load to the host processor 5.

(2) The addressing range of the memory access operation to be repeated according to the wraparound method can be adjusted by the set value of control data TGPLINE for control within a range of a number of display lines comparable to up to a maximum memory capacity of the partial RAM 70. In other words, the number of lines of the partial RAM 70 to be used for one page, which allows the action of writing display data into the whole memory and reading the written data therefrom to be performed two or more times in one frame, can be adjusted by a set value of the control data TGPLINE. Therefore, it becomes possible to flexibly cope with various structures meeting the requirements for the display resolution of a display panel and the detection resolution of a touch panel.

(3) Since the display drive period and the non-display drive period are created alternately in pages by use of the address counters 42 and 44 for RAM write and the counters 52 and 53 for display read, the arrangement in which the memory-addressing operation for writing display data into a data RAM and reading the written data from the data RAM to provide the read data to the drive circuit is repeated two or more times in a period of one display frame according to the wraparound method can be materialized relatively readily.

(4) The read of display data from the partial RAM 70 is started for each page-write address with the timing delayed from the timing of starting the write of display data to the partial RAM 70 by a predetermined period (TS_OFS+TS_PRD), and the end of the read so started is after the end of the write in page-write addresses. Therefore, duplicate use of more than one access address is avoided in the write to the partial RAM 70 for each page, and thus a smooth read can be performed. The predetermined period is determined by touch-detection-start-line-number data (TS_OFS), and the display-read-start-line-number data (TS_PRD), which can be changed respectively. Therefore, the touch detection period (non-display drive period) and the display drive period can be defined so that it can be varied with respect to the start of write to the partial RAM 70 in pages.

(5) In case that a request for write to the partial RAM 70 and a request for read thereon conflict with each other, the arbitration circuit 60 puts priority on the write request and as such, synchronization control by which the write from the host processor 5 is suspended is not required at all. In case that the partial RAM 70 is one having a perfect dual port, such arbitration is not required. However, in that case, the circuit scale of the partial RAM becomes twice, which is far from the truth.

(6) The unit of access of a request for read to the partial RAM 70 is the number of parallel data of one display line, and the unit of access of a request for write to the partial RAM is the number of parallel data in bus access. Therefore, a display-read period is shorter than the write period. In addition, even if priority is given to a write request with a read request conflicting therewith, the readout in display lines is performed after the write in bus accesses and as such, there is not the possibility of failing to read display data which has been already written in the partial RAM on an individual page basis at all.

(7) The switching cycle of the display lines, and the number of display lines of the display panel are controlled by the display line cycle data (RTN) and the display line number data (NL), both are variable. Therefore, the driver IC hereof can readily adapt to even various types of display panels which are different in the display line cycle and the number of display lines.

<<Second Embodiment of the Display Driver>>

Figure 8:
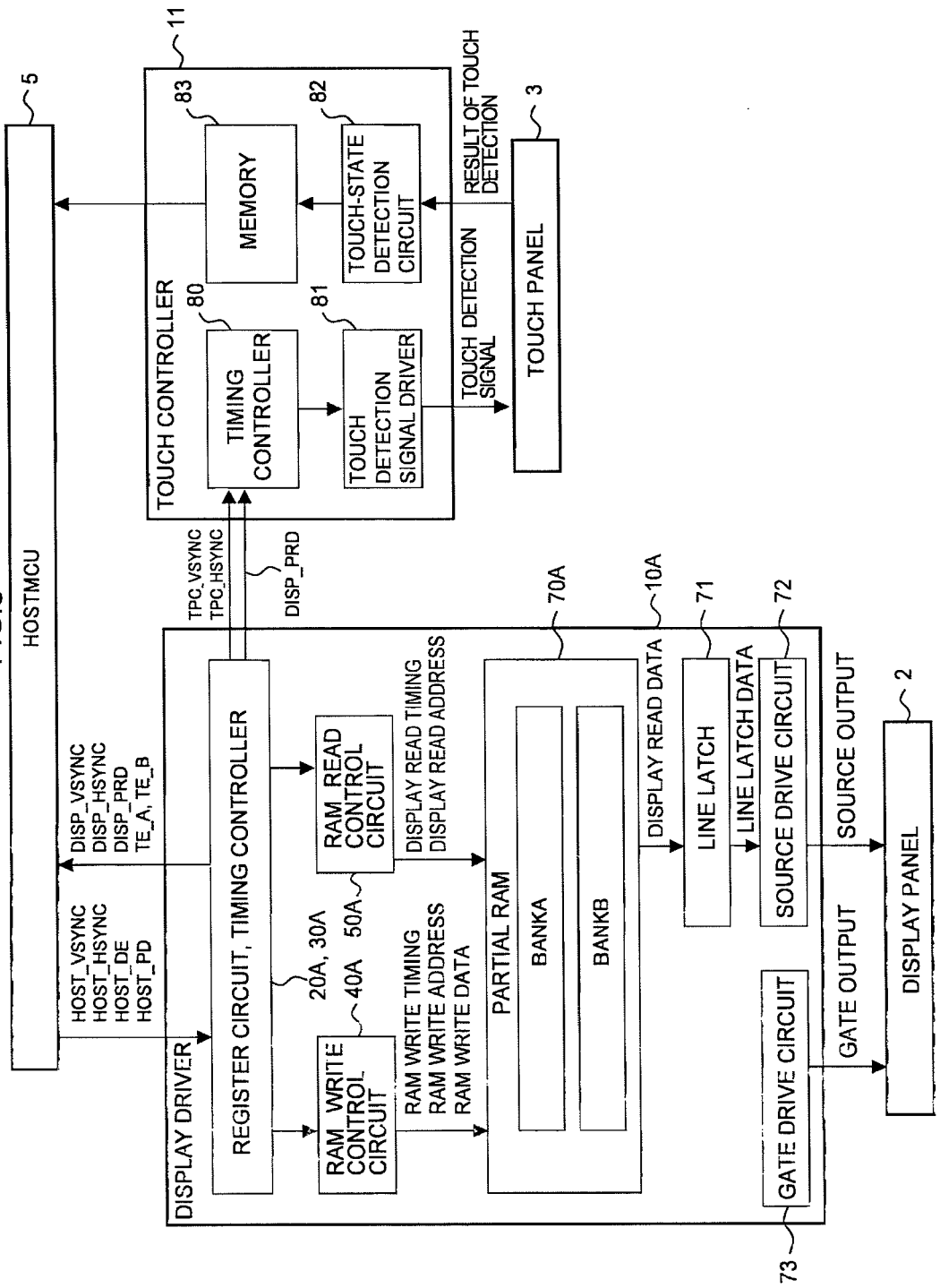
FIG. 8 is a block diagram showing another embodiment of the display driver.
Figure 9:
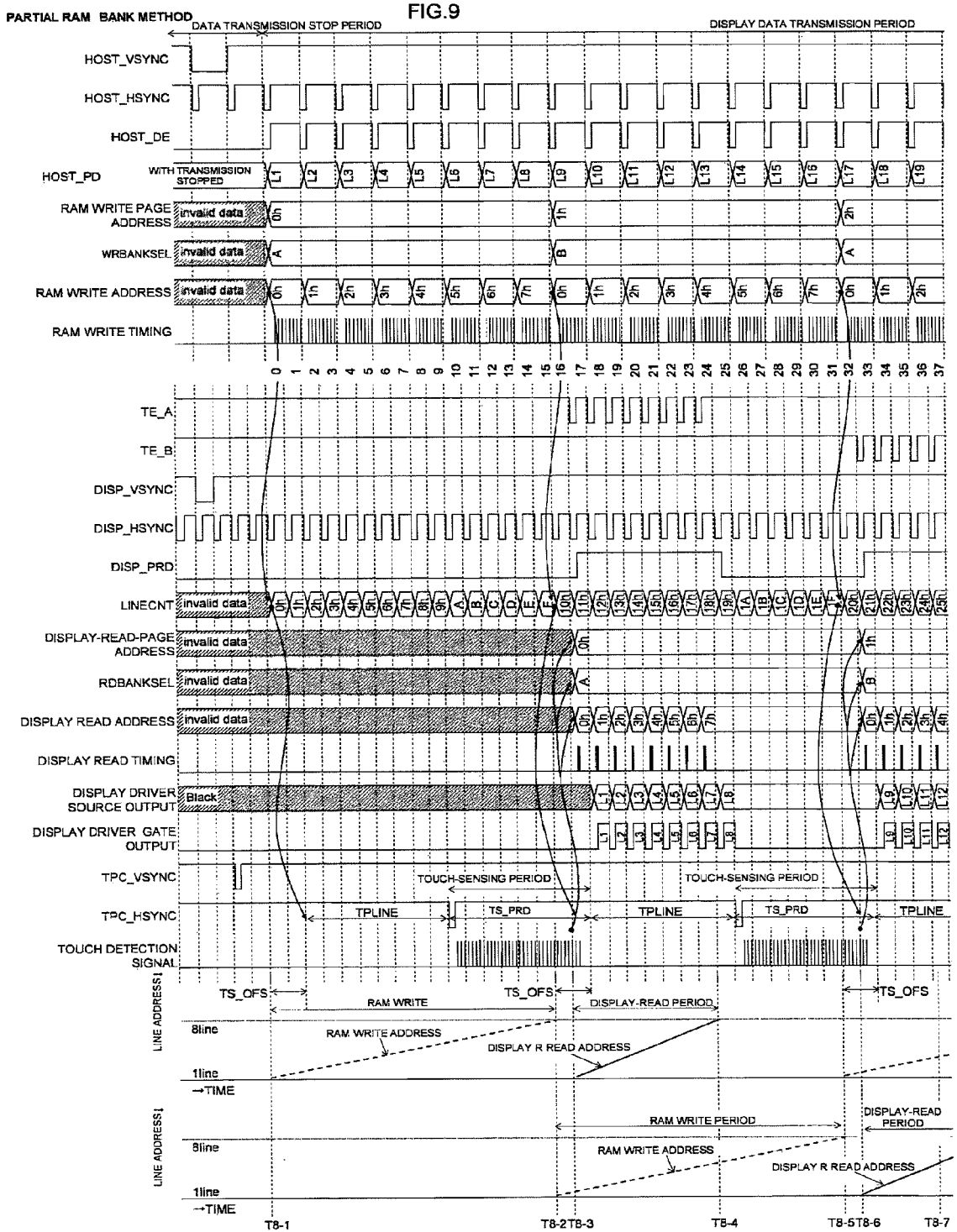
FIG. 9 is a timing diagram showing the first half portion of the timing of action control by the display driver of FIG. 8.
Figure 10:
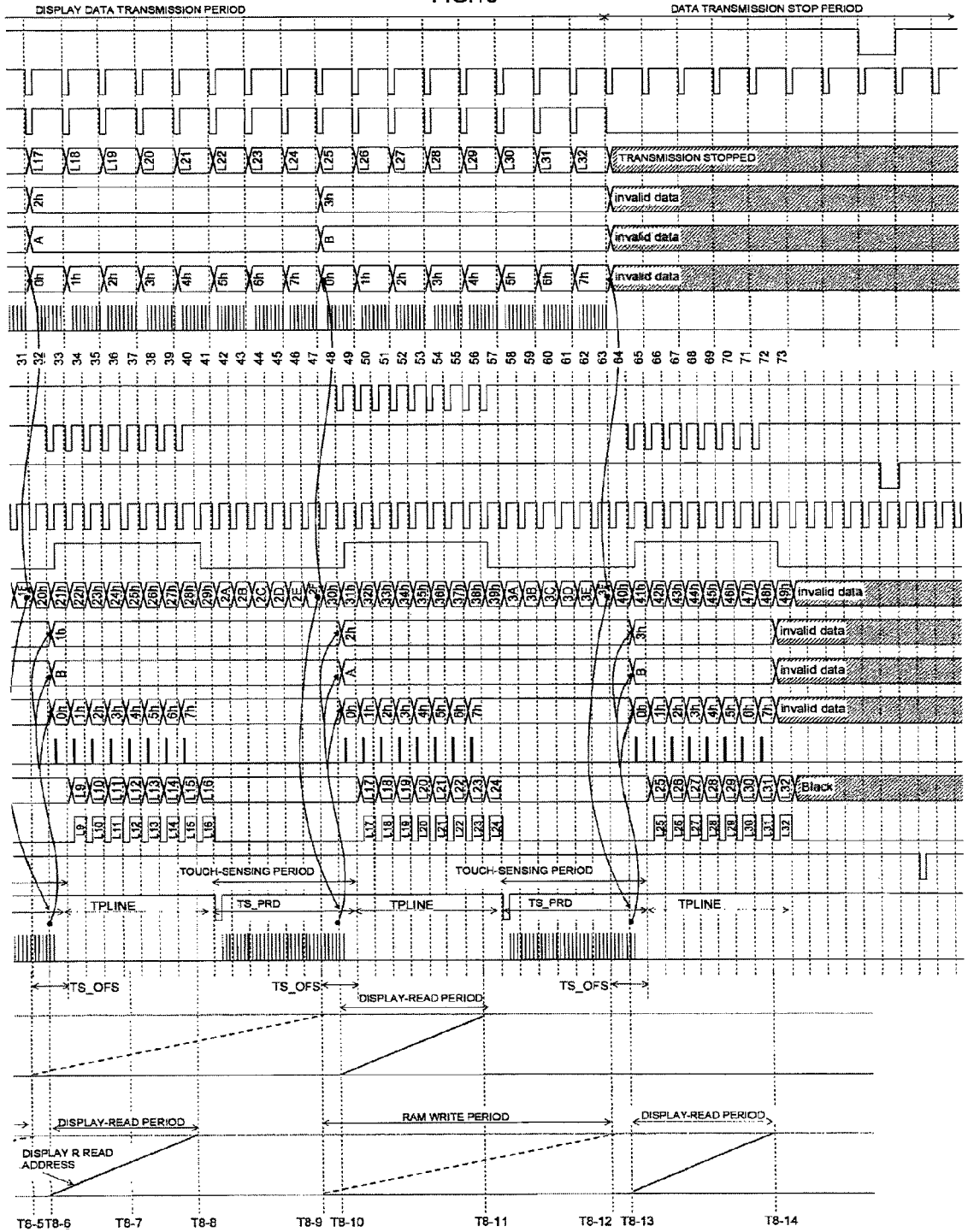
FIG. 10 is a timing diagram showing the latter half portion of the timing of action control by the display driver of FIG. 8.

FIG. 8 shows another embodiment of the display driver. The display driver 10A shown here is different from the display driver 10 of FIG. 1 in that the partial RAM 70A has a first memory bank BANKA and a second memory bank BANKB, and the data read and write are each performed exclusively by switching between the first memory bank BANKA and the second memory bank BANKS depending on the use of whether data write from the host processor 5 or data read to the display panel. FIGS. 9 and 10 show, by example, the timing of action control by the display driver 10A in combination. The timing diagrams of FIGS. 9 and 10 are drawn so as to overlap to connect with each other around Time T8-7. With reference to FIGS. 8, 9 and 10, the difference of the display driver 10A from the display driver of FIG. 1 will be described in detail. In an embodiment taken here, the display panel 2 has 32 display lines, and the display driver 10 is provided with a partial RAM 70A including memory banks BANKA and BANKB, each having an eight-line capacity.

The partial RAM 70A is the same as that of FIG. 1 in that write on the whole memory and read therefrom can be performed two or more times in one frame. The event of write and the event of display read cannot be caused at a time and therefore, write and read on the first and second memory banks BANKA and BANKS of the partial RAM 70A are performed while alternately repeating a write-access period and a read-access period. The number of lines of the partial RAM used for one page, namely the number of lines of each of the memory banks BANKA and BANKS can be adjusted by the control data TPLINE.

As to the register circuit 20A, the significance of the control according to offset-line-number data (TS_OFS) is different. Specifically, the offset-line-number data (TS_OFS) is control data for controlling an offset from the start of write to a write address at the top in a page by the number of display lines. The display-read-start-line-number data (TS_PRD) is control data for controlling the number of display lines between the position of a display line number decided by the offset-line-number data and the start of the subsequent display read, provided that execution of touch detection is started with a display line when a display line number specified by the touch interval period data is reached. The significances of other control data are the same as those in the embodiment of FIG. 1. According to these differences, the formula for calculation of the maximum count value LINECNTMAX of LINECNT which is counted by the display line cycle counter 32 in one frame is changed as follows: LINECNTMAX=TS_OFS+(TPLINE+TS_PRD)×PAGEMAX.

The timing controller 30A is different from that of FIG. 1 in the timing of generating the vertical synchronizing signal DISP_VSYNC and the display-drive-period signal DISP_PRD as shown in FIGS. 9 and 10. This is because the significances of the offset-line-number data (TS_OFS) and the display-read-start-line-number data (TS_PRD) are different from those in the embodiment of FIG. 1. Specifically, the touch detection is started at a time when going through a line number specified by TS_OFS+TPLINE after the start of write of a page, and the display drive is started at a time when going through a line number specified by TS_OFS after the start of readout of the page.

The RAM write control circuit 40A generates a write-bank-select signal WRBANKSEL, selects the first memory bank BANKA with respect to the initial value 0h of a RAM write-page address, and switches the selected memory bank each time the RAM write-page address is incremented by +1. The RAM read control circuit 50A generates a read-bank-select signal RDBANKSEL, selects the first memory bank BANKA with reference to the initial value 0h of a RAM read-page address, selects the first memory bank BANKA, and switches the selected memory bank each time the RAM read-page address is incremented by +1. The switching of RAM read page is delayed by one page from the switching of RAM write page. In other words, the first enable timing of the signal DISP_PRD is after a RAM write period for the top page has elapsed. Therefore, the memory bank to assign the write and read to is alternately switched for each page between the first memory bank BANKA and the second memory bank BANKB. The other features of the RAM write control circuit 40A and the RAM read control circuit 50A are the same as those of FIG. 1.

In the embodiment of FIGS. 9 and 10, display data continuously transmitted from the host processor 5 between the time T8-1 and T8-12 of the drawing are accumulated in the memory banks BANKA and BANKB of the partial RAM 70A in the display driver 10A in turn. The readout from the memory bank BANKB is enabled with written data put in the memory bank BANKA, whereas the readout from the memory bank BANKA is enabled with written data put in the memory bank BANKB. After the RAM write address of the partial RAM 70A has been incremented from 0 h to the maximum of 7 h, the RAM write address is reset, and incremented from 0h again. At this time, the memory bank to be selected which is specified by the write-bank-select signal WRBANKSEL is switched from BANKA to BANKB, or from BANKB to BANKA, thereby making control to avoid successively performing a write access to one memory bank.

In the embodiment of FIGS. 9 and 10, the display-read-stop period and the display-read period are repeated in turn. The periods of the time T8-1 to T8-3, T8-4 to T8-6, and T8-8 to T8-10 in the drawing are shown as the display-read-stop period. The periods of the time T8-3 to T8-4, T8-6 to T8-8 and T8-10 to T8-11 in the drawing are shown as the display-read period. The display-read-stop period corresponds to the non-display drive period. After the display read address of the partial RAM 70A has been incremented from 0h to the maximum of 7 h, the display read address is reset, and incremented from 0 h again. At this time, the memory bank to be selected which is specified by the read-bank-select signal RDBANK-SEL is switched from BANKA to BANKB, or from BANKB to BANKA, thereby making control to avoid successively performing a read access to one memory bank.

The line latch 71, the source drive circuit 72 and the gate drive circuit 73 are the same as those of FIG. 1. The signal for the host processor 5 to check the display read timing of the display driver 10A, which corresponds to TE of FIG. 1, is divided into a signal TE_A to be toggled with the display read timing of the memory bank BANKA of the partial RAM 70A, and a signal TE_B to be toggled with the display read timing of the memory bank BANKB, which makes difference of the display driver of FIG. 8 from that of FIG. 1.

The other features are the same as those of FIG. 1 and therefore, like pats or members are identified by the same reference numeral, character string, a combinations thereof, and its detailed description is omitted here.

The driver IC 10A of FIG. 9 brings about the effect and advantage as described below.

Figure 11:
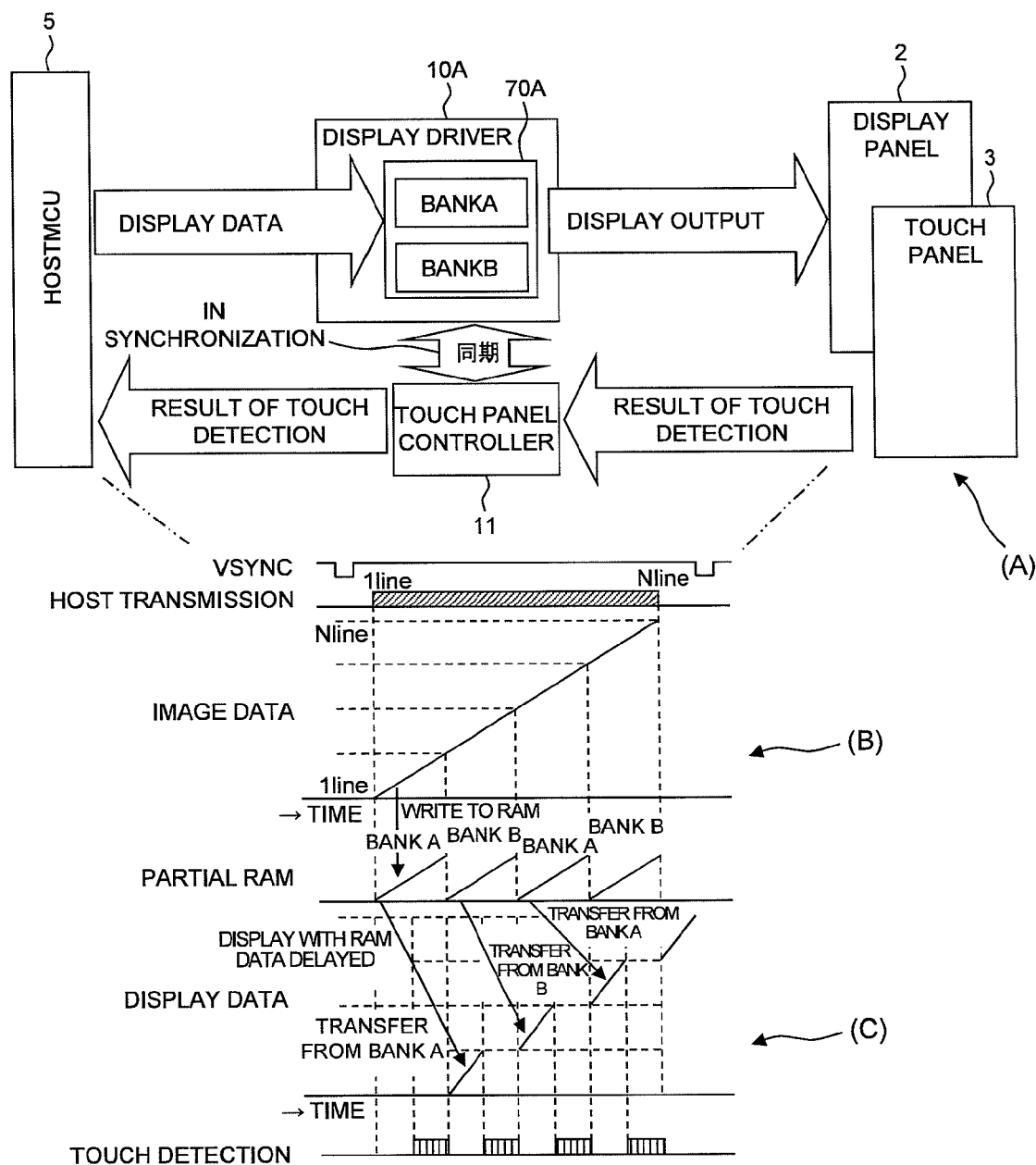
FIG. 11 is an explanatory diagram showing the structure and function of the display driver of FIG. 8 in combination.

(1) The display drive period and the non-display drive period are alternately created by repeating the memory-addressing operation for writing display data into the partial RAM 70A of double memory bank structure and reading the written display data from the partial RAM 70A at a speed faster than the writing speed to provide the read data to the source drive circuit 72 two or more times in a period of one display frame according to a wraparound method. This driving form is schematically shown by a combination of 11A to 11C in FIG. 11. In this way, it becomes unnecessary for the driver IC to have a RAM with a capacity as large as one frame and therefore, the chip size becomes smaller as achieved by the driver IC of FIG. 1. In addition, the driver IC having a partial RAM 70 operable to hold display data of more than one display line, but smaller than one display frame in capacity is not required to synchronously control the display data transfer from/to the host processor 5 and the stop thereof in the display drive period and the non-display drive period and therefore, the load to the host processor 5 can be lightened. Further, the memory-addressing operation for writing display data into the partial RAM 70A and reading the written data therefrom to provide the read data to the source drive circuit 72 is repeated two or more times in a period of one display frame according to the wraparound method and as such, the display drive period and the non-display drive period can be created alternately even in the case of using the partial RAM 70A of a capacity smaller than one display frame. Therefore, the touch detection accuracy can be increased while meeting both the requirement for reducing the chip size and the requirement for lightening the load to the host processor 5.

(2) The memory banks BANKA and BANKB are prepared in the partial RAM 70A, and the write and read of display data on the memory bank are performed while alternately switching between the memory banks. According to the embodiment like this, the conflict between write and read actions on one memory bank can be readily avoided by means of switching between the memory banks for write and read. Consequently, write and read actions on one memory bank never conflict with each other and as such, the need for the arbitration circuit 60 as in the embodiment of FIG. 1 is eliminated.

(3) In the case of using the memory banks BANKA and BANKB, the offset-line-number data (TS_OFS), display-read-start-line-number data (TS_PRD), and the touch interval period data (TPLINE) are all variable. The non-display drive period (touch detection period) and the display drive period can be variably set with respect to the write of a page top into the partial RAM 70A.

The other chief effect and advantage are the same as those brought about the driver IC of FIG. 1.

The invention is not limited to the above embodiments. It is obvious that various changes and modifications thereof may be made without departing from the subject matter thereof.

For instance, the display panel is not limited to a display panel with a liquid crystal. It may be another type of display panel such as a display panel to which electroluminescence is applied. The touch panel is not limited to the detection method by means of mutual capacitance. It may be any touch panel, as long as it has a structure arranged in consideration of the problem of drive noise of a display panel. In addition, the panel module is not limited to the in-cell form. It may have another structure such as a display panel with a touch panel superposed thereon.

The driver IC is not limited to the structure including a display driver (LCDDRV) and a touch panel controller (TPC) as described with reference to FIG. 2. It may include another circuit module such as a subprocessor which contributes to lightening the load to the host processor in terms of touch coordinate calculation. Also, the driver IC may be arranged to have no touch panel controller and to output its timing control signal to an external touch panel controller. The display device with such a driver IC incorporated therein may be of a portable type or no-portable type.

The data RAM is not limited to a single port one. It may be of a pseudo-multiport type.

The register circuit is not necessarily limited so that it can be rewritten by the host processor. For instance, in the case of a non-volatile register, it may be arranged so that it can be rewritten through a test terminal.

The write address counter circuit and the read address counter circuit are not limited so as to have a page counter and an address counter separately. It is obvious that the write address counter circuit and the read address counter circuit can be formed in a high-order side and a low-order side of one counter.

The unit of read from the partial RAM is not limited to the number of parallel data in bus access. The unit of data access for a write request is not limited to the number of parallel data of one display line, and it may be changed appropriately.

The memory bank of the partial RAM is not limited so as to be composed of two banks, and it may be composed of two or more banks.

What is claimed is:

1. A driver IC which controls an activation of a display panel and a detection timing of a touch panel comprising:
    a drive circuit operable to activate the display panel in a display drive period;
    a control circuit operable to create the detection timing of the touch panel in a non-display drive period during which the action of the drive circuit remains stopped, and to create the display drive period and the non-display drive period; and
    a data Random Access Memory (a data RAM) operable to hold display data of more than one display line, but smaller than one display frame in capacity,
    wherein the control circuit performs the control for alternately creating the display drive period and the non-display drive period by repeating a memory-addressing operation for writing display data supplied from outside into the data RAM and reading the display data from the data RAM at a speed faster than the writing speed to provide the read data to the drive circuit two or more times in a period of one display frame according to a wraparound method,
    wherein the control circuit has a register circuit for rewritably holding touch interval period data for controlling an addressing range of the memory-addressing operation to be repeated according to the wraparound method within a range of a number of display lines comparable to up to a maximum memory capacity of the data RAM, and
    wherein the touch interval period data is control data which controls a number of the display lines grouped that is counted so as to make an adjustable space between non-display drive periods based on the number of display lines grouped.

2. The driver IC according to Claim 1,
    wherein the control circuit handles, as a page, data of a data size of a number of display lines comparable to up to a maximum memory capacity of the data RAM, and
    the control circuit has: a write address counter circuit which creates a page-write address for each page in each cycle of a first frame synchronizing signal from outside, and creates an in-page line-write address for each page; and a read address counter circuit which creates a page-read address for each page in each cycle of a second frame synchronizing signal for display action, and creates an in-page line-read address for each page, and
    the control circuit creates the display drive period and the non-display drive period for each page-read address alternately, creates a line-read address in the display drive period, and stops the creation of the line-read address in the non-display drive period.

3. The driver IC according to claim 2,
    wherein the control circuit starts to read display data from the data RAM with a timing delayed from a timing of starting to write display data into the data RAM by a predetermined period for each page-write address, and
    the read action is ended after the end of the write to each page-write address.

4. The driver IC according to claim 3,
    wherein the register circuit further rewritably holds touch-detection-start-line-number data for controlling the number of display lines between the start of write to a write address of the top in a page and the start of touch detection, and display-read-start-line-number data for controlling the number of display lines between the position of a display line number decided by the touch-detection-start-line-number data and the start of display read after execution of touch detection, and
    the predetermined period is determined by a sum of the touch-detection-start-line-number data and the display-read-start-line-number data.

5. The driver IC according to claim 4,
    wherein the control circuit has a line counter which counts, for each display frame, display lines in each display line cycle after start of write to a write address of a top of a top page, and
    the control circuit makes a judgment on a line number coming from the touch detection line number data, and a line number coming from the display-read-start-line-number data based on a count value of the line counter.

6. The driver IC according to claim 3,
    wherein a unit of data access according to a read request to the data RAM is made larger than a unit of data access according to a write request, and
    the control circuit has an arbitration circuit which gives priority to the write request on condition that the write request and the read request conflict with each other.

7. The driver IC according to claim 6,
    wherein the access unit according to the read request is the number of parallel data of one display line, and
    the access unit according to the write request is the number of parallel data of bus access.

8. The driver IC according to claim 2,
    wherein the register circuit rewritably holds:
    display line cycle data for controlling a display line cycle of the display panel, which is a switching cycle of a display line to be driven; and
    display line number data for controlling the number of display lines of the display panel to be driven.

9. The driver IC according to claim 8,
wherein the control circuit handles, as a page, data of a data size of a number of display lines comparable to up to a maximum memory capacity of the data RAM,
the control circuit has:
  a write address counter circuit which creates a page-write address for each page in each cycle of a first frame synchronizing signal from outside, and creates an in-page line-write address for each page; and
  a read address counter circuit which creates a page-read address for each page in each cycle of a second frame synchronizing signal for display action, and creates an in-page line-read address for each page,
  the control circuit creates the display drive period and the non-display drive period for each page-read address alternately, creates a line-read address in the display drive period, and stops the creation of the line-read address in the non-display drive period, and
  the register circuit further rewritably holds touch-detection-start-line-number data for controlling the number of display lines between the start of write to a write address of the top in a page and the start of touch detection, and display-read-start-line-number data for controlling the number of display lines between the position of a display line number decided by the touch-detection-start-line-number data and the start of display read after execution of touch detection.

10. The driver IC according to claim 9,
wherein the control circuit has a line counter which counts, for each display frame, display lines in each display line cycle after start of write to a write address of a top of a top page, and
the control circuit makes judgment on the number of lines in a touch interval period coming from the touch interval period data, the number of lines coming from the touch-detection-line-number data, and the number of lines coming from the display-read-start-line-number data based on a count value of the line counter.

11. The driver IC according to claim 8,
wherein the data RAM has memory banks,
the control circuit reads data from one memory bank while writing the other memory bank, and
the control circuit alternately switches between the memory bank targeted for write and the memory bank targeted for read,
the register circuit further rewritably holds:
  offset-line-number data for controlling an offset from the start of write to a write address at the top in a page by the number of display lines; and
  display-read-start-line-number data for controlling the number of display lines between a position of a display line number decided by the offset-line-number data and the start of the subsequent display read, provided that execution of touch detection is started with a display line when a display line number specified by the touch interval period data has been reached.

12. The driver IC according to 11,
wherein the control circuit has a line counter which counts, for each display frame, display lines in each display line cycle after start of write to a write address of a top of a top page, and
the control circuit makes judgment on the number of lines in a touch interval period coming from the touch interval period data, the number of lines coming from the touch-detection-line-number data, and the number of lines coming from the display-read-start-line-number data based on a count value of the line counter.

13. The driver IC according to Claim 1,
wherein the data RAM has memory banks,
the control circuit reads data from one memory bank while writing the other memory bank, and
the control circuit alternately switches between the memory bank targeted for write and the memory bank targeted for read.

14. The driver IC according to claim 13,
wherein the control circuit sets one of the pair of memory banks as a memory bank targeted for write in a first non-display drive period for each display frame, and sets the other memory bank as a memory bank targeted for read in a first display drive period, and
the control circuit switches between the memory bank targeted for write and the memory bank targeted for read at each page switching.

15. A display device comprising:
a panel module having a display panel and a touch panel incorporated in the display panel; and
a driver IC provided in the panel module and operable to perform an activation control of the display panel and a detection control of the touch panel,
wherein the driver IC has a drive circuit operable to drive the display panel in a display drive period,
a touch panel controller operable to perform the detection control of the touch panel in a non-display drive period during which the action of the drive circuit remains stopped,
a data Random Access Memory (a data RAM) operable to hold display data of more than one display line, but smaller than one display frame in capacity, and
a control circuit operable to perform the control for alternately creating the display drive period and the non-display drive period by repeating a memory-addressing operation for writing display data supplied from outside into the data RAM and reading the display data from the data RAM at a speed faster than the writing speed to provide the read data to the drive circuit two or more times in a period of one display frame according to a wraparound method, and further arranged so that the display drive period and the non-display drive period are specified within a line number range of numbers of display lines corresponding to no more than a maximum memory capacity of the data RAM,
wherein the control circuit has a register circuit for rewritably holding touch interval period data for controlling an addressing range of the memory-addressing operation to be repeated according to the wraparound method within a range of a number of display lines comparable to up to a maximum memory capacity of the data RAM, and
wherein the touch interval period data is control data which controls a number of the display lines grouped that is counted so as to make an adjustable space between non-display drive periods based on the number of display lines grouped.

16. The display device according to claim 15,
wherein the control circuit handles, as a page, data of a data size of a number of display lines comparable to up to a maximum memory capacity of the data RAM, and
the control circuit has:
  a write address counter circuit which creates a page-write address for each page in each cycle of a first frame synchronizing signal from outside, and creates an in-page line-write address for each page; and a read address counter circuit which creates a page-read address for each page in each cycle of a second frame synchronizing signal for display action, and creates an in-page line-read address for each page, and the control circuit creates the display drive period and the non-display drive period for each page-read address alternately, creates a line-read address in the display drive period, and stops the creation of the line-read address in the non-display drive period.

17. The display device according to claim 15, wherein the data RAM has memory banks, the control circuit reads data from one memory bank while writing the other memory bank, and the control circuit alternately switches between the memory bank targeted for write and the memory bank targeted for read.

* * * * *